(12) United States Patent
Peel et al.

(10) Patent No.: US 11,733,504 B2
(45) Date of Patent: Aug. 22, 2023

(54) FILM THROUGH SCOPE CAMERA MOUNT SYSTEM

(71) Applicant: Tactacam LLC, Caledonia, MN (US)

(72) Inventors: Jeffrey B. Peel, Decorah, IA (US); Garrison J. Peel, Caledonia, MN (US); Benjamin B. Stern, Holmen, WI (US)

(73) Assignee: TACTACAM LLC, Caledonia, MN (US)

( * ) Notice: Subject to any disclaimer, the term of this patent is extended or adjusted under 35 U.S.C. 154(b) by 144 days.

(21) Appl. No.: 17/241,225

(22) Filed: Apr. 27, 2021

(65) Prior Publication Data

US 2021/0333538 A1    Oct. 28, 2021

Related U.S. Application Data

(60) Provisional application No. 63/015,788, filed on Apr. 27, 2020.

(51) Int. Cl.
   *G02B 23/04*       (2006.01)
   *G02B 23/16*       (2006.01)
   (Continued)

(52) U.S. Cl.
   CPC ............... *G02B 23/04* (2013.01); *F41G 1/30* (2013.01); *F41G 1/38* (2013.01); *G02B 23/16* (2013.01); *H04N 23/51* (2023.01)

(58) Field of Classification Search
   CPC ........... G02B 23/04; G02B 23/16; F41G 1/30; F41G 1/38; H04N 5/2252; H04N 5/2254
   See application file for complete search history.

(56) References Cited

U.S. PATENT DOCUMENTS

| 3,911,451 A | 10/1975 | Vockenhuber |
| 4,576,432 A | 3/1986 | Ruger |

(Continued)

FOREIGN PATENT DOCUMENTS

| EP | 3031494 | 6/2016 | |
| GB | 2548836 A | * 10/2017 | ............... F41G 1/32 |

(Continued)

OTHER PUBLICATIONS

PCT, Notification of Transmittal of the International Search Report and the Written Opinion of the International Searching Authority, in application No. PCT/US2019/045247, dated Oct. 17, 2019 (8 pages).

(Continued)

*Primary Examiner* — Shadan E Haghani
(74) *Attorney, Agent, or Firm* — McAndrews, Held & Malloy, Ltd.

(57) ABSTRACT

Systems and methods are described which provide a film through scope camera mount including a housing that includes a beam splitter, first and second mirrors, and a sensor. The camera mount system may receive an input optical signal from a first direction; split the input optical signal using the beam splitter such that a first portion of the input optical signal may be communicated out of the camera mount system in a second direction and a second portion of the input optical signal may be reflected lateral to the first direction; reflect the reflected signal vertically using the first mirror; reflect the vertically reflected signal in a second lateral direction using the second mirror; and receive the signal reflected by the second mirror in the sensor, which may comprise a visible light sensor and/or an infrared sensor.

20 Claims, 15 Drawing Sheets

(51) Int. Cl.
  *F41G 1/30* (2006.01)
  *F41G 1/38* (2006.01)
  *H04N 23/51* (2023.01)

(56) References Cited

U.S. PATENT DOCUMENTS

| | | | |
|---|---|---|---|
| 4,621,888 | A | 11/1986 | Crossland |
| 5,020,262 | A * | 6/1991 | Pena .................. F41C 27/00 396/432 |
| H1891 | H | 10/2000 | McClenahan |
| 6,539,661 | B2 | 4/2003 | Hope |
| 6,604,316 | B1 | 8/2003 | Custer |
| 10,754,240 | B2 | 8/2020 | Peel et al. |
| 11,567,398 | B2 | 1/2023 | Peel et al. |
| 2003/0218742 | A1* | 11/2003 | Fashant ............. G02B 21/0016 356/237.2 |
| 2005/0252063 | A1 | 11/2005 | Flannigan |
| 2007/0160362 | A1* | 7/2007 | Mitsuo ................ G03B 13/06 396/373 |
| 2010/0288934 | A1 | 11/2010 | Keppel et al. |
| 2013/0165731 | A1 | 6/2013 | Cernica |
| 2013/0185985 | A1 | 7/2013 | Ballard |
| 2013/0333266 | A1 | 12/2013 | Gose |
| 2014/0350325 | A1 | 11/2014 | Van Appeldoorn et al. |
| 2016/0047626 | A1* | 2/2016 | Kremer ................. G03B 17/02 42/119 |
| 2016/0061567 | A1 | 3/2016 | Regan |
| 2019/0376764 | A1 | 12/2019 | Hammond |
| 2022/0264058 | A1* | 8/2022 | Portoghese ............ F41G 11/00 |

FOREIGN PATENT DOCUMENTS

| | | |
|---|---|---|
| WO | 2013012331 | 1/2013 |
| WO | 2014087289 | 6/2014 |
| WO | 2016093942 | 6/2016 |

OTHER PUBLICATIONS

Side-Shot Scope Cam, https://www.side-shot.com/, home page [web page and screen shots retrieved from the internet on Aug. 6, 2019], (8 pages).
Side-Shot Scope Cam, https://www.side-shot.com/online [web page and screen shots retrieved from the internet on Aug. 6, 2019], (2 pages).
Video Your Hunt, Homepage, iScope Optics, https://iscope.com [retrieved from the internet on Aug. 6, 2019], (7 pages).
Phone Skope, How Phone Skope Works, https://www.phoneskope.com [retrieved from the internet on Aug. 6, 2019], (4 pages).
MAK Group: Kilic Feintechnik GmbH—Mak C.E.T.—MAK Turkey, Optics, https://www.mak.ag/en/Optics [retrieved from the internet on Aug. 6, 2019], (2 pages).
Notification of Transmittal of The International Search Report And The Written Opinion of the International Searching Authority, or the Declaration, dated Apr. 29, 2021, International Application No. PCT/IB2020/001025, International Filing Date Dec. 3, 2020 for Applicant Nu-Rise LDA.
Notification Concerning Transmittal of International Preliminary Report On Patentability (Chapter 1 of the Patent Cooperation Treaty), dated Feb. 18, 2021 for International Application No. PCT/US2019/045247, International Filing Date Aug. 6, 2019, Applicant Tactacam LLC.

\* cited by examiner

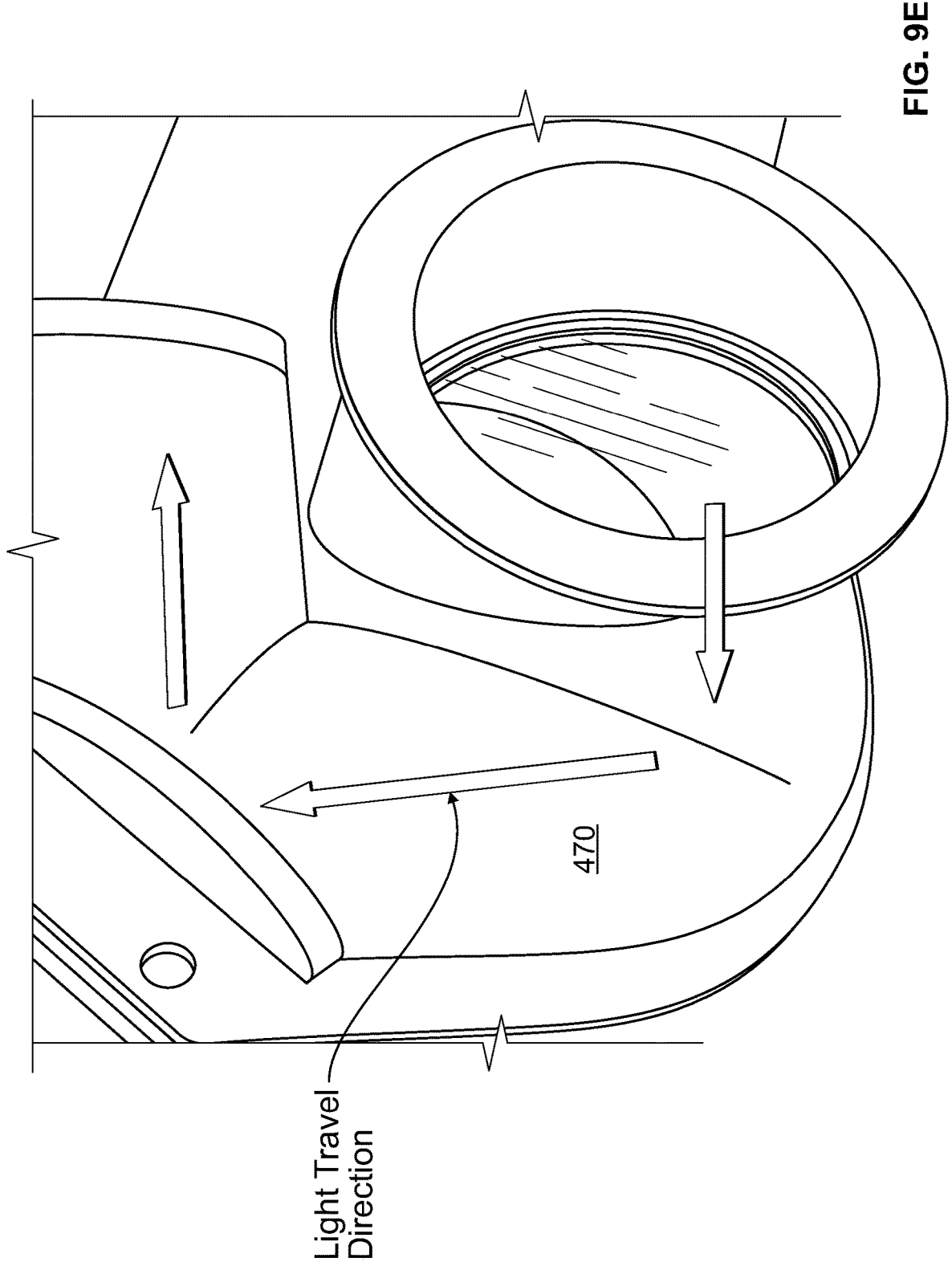

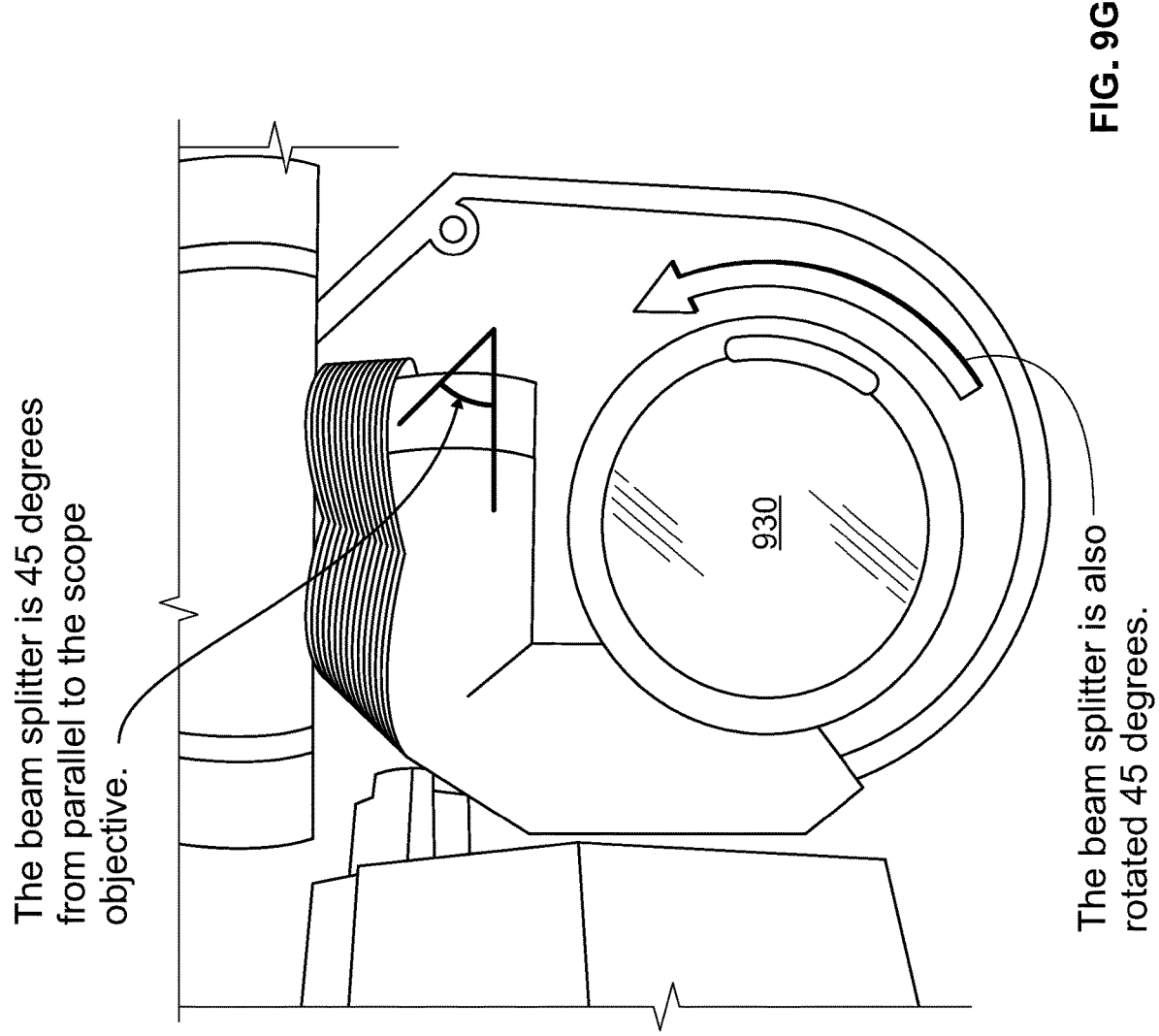

FILM THROUGH SCOPE CAMERA MOUNT SYSTEM

CLAIM OF PRIORITY

This patent application claims priority to and the benefit of U.S. provisional patent application 63/015,788 filed on Apr. 27, 2020, the entirety of which is hereby incorporated by reference.

BACKGROUND

Recording distant video or images through a scope can suffer from a multitude of difficulties.

For example, a smartphone can be secured behind a scope on a rifle. This can be a rather bulky, off-center configuration in which the shooter no longer directly looks through the optics of the scope. Instead of directly looking through the scope, the shooter must adjust to a different positioning (e.g., the off-center positioning since the smartphone camera is located in a corner of the smartphone housing) of the smartphone and the height and width of the display of the smartphone. Typically, the human eye has a hard time focusing on objects that are approximately 3 to 4 inches away, which is the distance of the focused visual cone from the scope and is the normal distance of the shooter's eye from the scope on a weapon. The smartphone configuration alters the shooter's natural position behind the scope since the viewer must focus on the off-center display of the smartphone. This can cause inaccurate and/or inconsistent shots. Further, to locate and/or track a moving target, the shooter must repeatedly look from up close (e.g., approximately 3 to 4 inches away where the display of the smart phone is located) to far away (e.g., down range where the target is located) and back. Not only does this cause eye strain for the shooter, but also impedes the shooter's ability to locate and/or track the moving target. Finally, the smartphone is difficult to optically align and moves out of optical alignment especially when shooting a high recoil rifle.

Some scopes are built with video cameras that employ a display at the back of the scope to display a video image back to the shooter. The shooter is unable to directly use the optic of the scope and instead must rely on the display at the back of the scope. Such scope displays are stressful for eyes focusing on such a close display, which can make it difficult for the shooter to locate a target (e.g., a moving target). In particular, when the display is located in the scope, the shooter's eyes dilate to adjust to the artificial light of the internal display. When the shooter looks past the scope to locate a target, the shooter's eyes must adjust its focus for the new distance and constrict to accommodate the change in lighting conditions (e.g., from artificial interior light to natural outdoor light). These repeated eye adjustments can be the cause of stress and strain on the eye. Further, since the scope is electronic, the scope cannot be used if the battery runs out of energy.

Finally, standalone cameras (e.g., a point-and-shoot camera) can be mounted on a rifle. However, such configurations are unwieldy. Moreover, the alignment between the camera and the aiming point of the rifle can be inconsistent for the shooter. In addition, the camera does not provide the shooter's view (e.g., a first person shooter's view), but instead provides a view from a different angle and not the view through the scope.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems and methods for providing a film through scope camera mount system substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

FIGS. 9A-G show an embodiment of a camera mount system in which the first housing is open.

DETAILED DESCRIPTION

Figure 1:
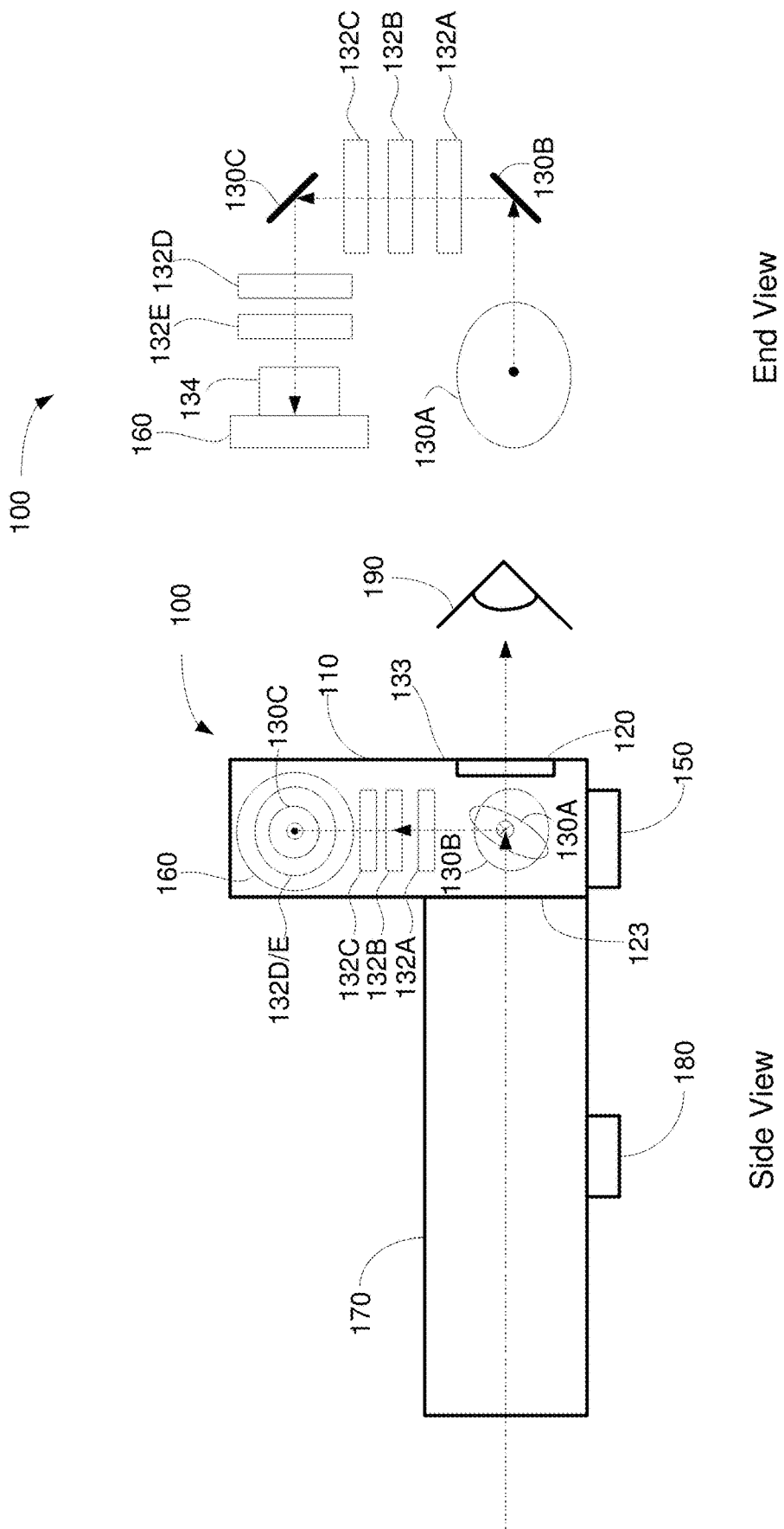
FIG. 1 shows an example film through scope camera mount system according to an embodiment of the present disclosure.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "example" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure relate to systems, apparatuses, and methods that provide a film through scope camera mount system.

Some embodiments according to the present disclosure provide a camera mount system that includes, for example, a film-through-scope mount that can be attached to or integrated with a scope that is secured to a weapon such as rifle, for example.

Some embodiments according to the present disclosure provide that the film through scope camera mount system is positioned behind a scope such that a user can look through the optics of the scope at the same time as a camera is recording the same view through the optics of the scope. The camera may comprise, for example, one or more of the following: a recording device, a video recorder, an image recorder, one or more sensors, one or more sensor arrays, etc., and can be attached to and/or incorporated into the camera mount system. In some embodiments, via the camera mount system, the camera receives the same view through the scope as seen by the user. The camera and the user both share the optic of the scope. Some embodiments provide that no digital screen is necessary for the user to see through the scope. Instead, the user looks through the optic of the scope via an eyepiece of the camera mount system.

Some embodiments according to the present disclosure provide that the film through scope camera mount system includes a plurality of mirrors including, for example, at least one mirror that reflects and transmits light in different directions. In some embodiments, the plurality of mirrors includes a beam splitter. The light that is transmitted through the mirror travels to the user's eye. The light that is reflected travels to the camera (e.g., recording device, video recorder, image recorder, one or more sensors, one or more sensor arrays, etc.). In some embodiments in which the light comes through the optics of a scope, the user can record images or video while also looking through the actual optics of the scope. Further, the camera and the user both access the same view at the same angle without any parallax. This can result in less eye strain for the user and greater ease in target location and tracking.

Some embodiments according to the present disclosure provide that, although the film through scope camera and/or camera mount system are battery operated, the user can still use the scope, via the camera mount system, even if the camera and/or camera mount system run out of energy (e.g., battery charge) and/or are not powered.

FIG. 1 shows an example film through scope camera mount system according to an embodiment of the present disclosure. Referring to FIG. 1, a camera mount system 100 includes, for example, a housing 110, an eyepiece 120, mirrors 130A-130C, lenses 132A-132D, and a camera 160. The camera mount system 100 may also have an optional mount 150. In some embodiments, the mirrors 130A-130C comprise, for example, one or more of the following: an optical device, an optical element, a reflecting material, a transmissive material, an anti-reflective coating, an optical beam splitter (e.g., an optical beam splitter prism, a device or structure or element that transmits and reflects light in different directions, etc.), etc . . . , depending on the desired optical path.

Each of the mirrors 130A-130C may be optically aligned to work together to reflect optic signals received from the scope 170 to the camera 160 and the eye 190. The mirror 130A may comprise a beam splitter, where a portion of the optical passes through to the eyepiece 120 and the remaining signal is reflected to mirror 130B. The mount 150 may configured for securing and/or positioning the camera mount system 100. In addition that mount 150 is directly coupled to scope 170. In some embodiments, the mount 150 includes a flip-to-side mount that is used on weapons such as rifles, hand guns, bows, etc.

Referring to FIG. 1, the camera 160 of the camera mount system 100 is aligned with the optical path defined by the mirrors 130A-130C and lenses 132A-E. In some embodiments, the camera 160 and the camera mount system 100 are integrated into a single unit. In some embodiments, the camera 160 is removably attached and/or secured to the camera mount system 100. The camera 160 can include, for example, a camera, a recorder, a video recorder, an image recorder, one or more sensors, one or more camera sensors, etc. The sensors may comprise visible and/or infrared/thermal sensors.

Scope 170 is positioned in front of the camera mount system 100. In some embodiments, the scope 170 and the camera mount system 100 are integrated into a single unit. In some embodiments, the scope 170 is positioned in front of the camera mount system 100 and removably secured and/or attached to the camera mount system 100. In some embodiments, the mount 180 includes a flip-to-side mount for the scope and/or the camera mount system 100. The scope 170 includes, for example, a mount 180 and optical elements (not shown). In some embodiments, the scope 170 provides magnification, focus, and field-of-view adjustment capabilities.

In some embodiments, the scope 170 is mounted on a weapon (or other platform) via its mount 180, which can allow adjustments for changing the position (e.g., elevation, windage, etc.) of the scope 170. The camera mount system 100 may be mounted on the scope 170 and/or on the weapon (or other platform) so that the eyepiece 120 of the camera mount system 100 optically aligns with the optical elements of the scope 170. In some embodiments, the mount 150 of the camera mount system 100 is provided to allow adjustments for changing the position (e.g., elevation, windage, etc.) of the camera mount system 100 and/or elements (e.g., optical elements, mirrors, etc.) in the camera mount system 100. In some embodiments, the mount 150 is optional, and the housing 110 is removably attached to the scope 170.

In some embodiments, the mount 150 of the camera mount system 100 includes a flip-to-side mount so that the camera 160 and the housing 110 of the camera mount system 100 can be flipped to the side giving the user direct access to the scope 170 with no housing 110 therebetween. In some embodiments, one or more flip-to-side mounts 180 and/or 150 can be used to flip one or more of the camera 160, the housing 110, and/or the scope 170 to the side.

Some embodiments provide that one or both of the scope 170 and the camera 160 can be attached to the housing 110 of the camera mount system 100. The scope 170 and/or the camera 160 can be attached to the housing 110 by any number of ways including one or more of the following: a collet system; tightened collars (e.g., screw-tightened collars); cam-lever tightened collars and/or systems; sleeves (e.g., eye-piece sleeves); screws (e.g., nylon-tipped set screws and other types of screws); fasteners; straps (e.g., Velcro straps, hook-and-loop fastener straps, rubber straps, etc.); etc.

In operation according to some embodiments, light such as, for example, light forming an image of a target that is in the distance, for example, enters the scope 170 and is focused and/or magnified by the scope 170 before entering the camera mount system 100. In some embodiments, the target can be approximately 200 to approximately 600 yards away, but the target can also be closer or farther away than that range. The scope 170 can also be employed to change the field of view. The first mirror 130A allows the image to be reflected to the second mirror 130B along a first optical path. In addition, the first mirror 130A allows the image to be passed through or transmitted along a second different optical path to the eyepiece 120 of the camera mount system 100. In some embodiments, the first optical path may be substantially perpendicular to the second optical path.

In some embodiments, a first portion of the light of the image is reflected along the first optical path, and a second portion of the light of the image is transmitted along the second different optical path. In some embodiments, the image propagating along the first optical path is the same as the image propagating along the second optical path. In some embodiments, the image propagating along the first optical path and the image propagating along the second optical path have the same or different light intensities, same or different amplitudes, same or different polarizations, and/or same or different orientation. In some embodiments, additional optical elements (e.g., mirrors, lenses, beam splitters, etc.) can be added to effect changes in light intensities, amplitudes, polarizations, orientations, magnification, focus, etc. and/or to add create and/or combine additional optical paths.

The user sees the image traveling along the second optical path through the eyepiece 120 of the camera mount system 100. Thus, the user is using the optics of the scope 170 without interference from electronic displays (e.g., electronic screens).

The image received by the second mirror 130B may be reflected upward within the housing 110 and focused by the lenses 132A-132C before being reflected by the mirror 130C to the camera 160 via the lenses 132E and 132D and sensor tube 134. It should be noted that the lenses 132A-132E are optional and one or more, or even all of the lenses may be omitted, depending on the focal requirements of the sensor 160. The sensor tube 134 may provide optical isolation for the sensor 160. In addition, the entire light path within the housing 110 may be enclosed via a non-reflective surface. Depending on the optical power of the scope 170, one or more of the lenses 132A-132D may not be needed, as the number of lenses shown is merely an example. The optical signal path is shown in FIG. 1 by the dashed line, and directions into or out of the plane of the figure are indicated by a circle with a dot in the center (directed out of the plane of the figure) or a circle with an "X" within (directed into the plane of the figure).

Light redirected to the camera 160 may be recorded and/or re-transmitted to other devices, such as a smart phone or other device. In some embodiments, the image may reflected by the second mirror 130B in a direction that is different (e.g., substantially opposite, at an angle, at substantially 90°, etc.) with respect to the direction defined by the image transmission direction through the first mirror 130A to the eye 190 of the user. In some embodiments, the image is reflected by each of the mirrors 130A-130C in a direction that is substantially perpendicular to the direction of light propagation through the scope 170.

In some embodiments, the scope 170 may be integrated with the camera mount system 100 and the camera 160. For example, the scope 170 can house the first mirror 130A (e.g., the beam splitter) and/or one or more camera sensors which receive reflected light from the first mirror 130A. Light passing through the first mirror 130A can go to the eye 190 of the user via an eyepiece of the scope 170, for example.

In some embodiments, the image received by the camera 160 has already been magnified and/or focused and/or the field of view has already been set by the scope 170 and/or the camera mount system 100. Thus, in some embodiments, the camera 160 can be a simplified, stream-lined, lightweight camera, sensor, or other type of recording device. In some embodiments, the camera 160 might or might not have the optical elements (e.g., large lenses) used for magnifying, focusing, and/or changing the field of view. In some embodiments, the magnification and/or focusing and/or adjustment of the field of view occurs at the scope 170 and the lenses 132A-132E of the camera mount system 100.

In some embodiments, the camera mount system 100 provides precision optical alignment between the scope 170, the mirrors 130A-130C, the lenses 132A-132E, and the camera 160. The camera mount system 100 provides adjustments so that, for example, the camera 160 and the scope 170 are concentric and the optical axes are aligned. Spacers allow the housing 110 of the camera mount system 100 to be placed on the scope 170 with concentricity maintained via spacer adjustments. In addition, the housing 110 provides other adjustment mechanisms, such as adjustment screws, to fine tune the concentric alignment.

In some embodiments, the camera mount system 100 can provide high precision alignment, thereby enabling the camera mount system 100 to effectively record images and/or video through the scope 170. In some embodiments, a large monitor and high magnification is used to precisely align, for example, the scope 170 with the mount system 100 to create precisely centered video and/or images.

In some embodiments, the camera mount system 100 integrates seamlessly with the scope 170, thereby allowing the user full use of the user optics and, if applicable, proper function of the weapon. The camera mount system 100 is also robust unlike other systems (e.g., systems based on mounting a smartphone) which do not fit well together and/or are not ergonomic. Those other systems are difficult to align and often move out of alignment, for example, when shooting the weapon. In addition, those other systems are disadvantageous in that eye relief is greatly reduced or completely sacrificed, because the focal plane of the scope is at a distance from the eyepiece 120. The camera mount system 100 overcomes these issues with respect to the other systems because of the extended optical path in the housing 110 via the mirrors 130A-130C and lenses 132A-132E. In an example embodiment of the disclosure, the distance between the end of the scope 170 and the outer surface of the eyepiece 120 is 1 to 3 inches, in contrast to existing systems with much longer distance needed to meet the image plane requirements of the scope 170, resulting in significant lost eye relief. Reduced eye relief can cause safety issues where the eyepiece can injure the user's eye due to the recoil of the weapon upon firing.

In some embodiments in which one or both of the camera 160 and the camera mount system 100 are battery operated, the user can still look through the eyepiece 120 of the camera mount system 100 even if one or both of the camera 160 and the camera mount system 100 are no longer powered. Further, the user can also employ the functionality of the mount 150 if the mount 150 includes a flip-to-side mount and flip the housing 110 of the camera mount system 100 and the attached camera 160 to the side, thereby giving the user access to the scope 170 without the camera mount system 100 therebetween.

In some embodiments, one or both of the camera 160 and the camera mount system 100 provide a display that can be used to display images and/or video captured and/or livestreamed by the camera 160. The display can also show what the camera 160 and/or the scope 170 is viewing. In some embodiments, one or both of the camera 160 and the camera mount system 100 can include one or more wireless transceivers and/or antennas that provide wireless communications (e.g., WiFi communications, Bluetooth communications, cellular communications, IEEE 802.11 communications, wireless local area network communications, wide area network communications, wireless network communications, etc.) and/or wired communications so that images and/or video captured and/or live-streamed by the camera 160 can be shared with other communication devices that might also have respective displays on which to view images and/or video captured or live-streamed by the camera 160. Similarly, one or both of the camera 160 and the camera mount system 100 can also receive, re-transmit, and/or display images and/or video captured and/or live-streamed by other devices.

In some embodiments, the scope 170 includes a spotting scope or other type of scope or viewer to which the camera mount system 100 is attached. In some embodiments, the camera mount system 100 can adapt to any optic, for example, even an optic with an approximately 0 millimeter or inches to approximately 0.5 millimeter or inches eye relief, for example. In some embodiments, the camera mount system 100 can adapt to an optic with other eye relief distances and/or ranges. In some embodiments, the camera 160 with a display can be mounted to the spotting scope 170, for example, and the display can show images and/or video capture or live-streamed by the camera 160. The display can show, for example, the view of whatever the spotting scope is pointed at. The display can be part of the spotting scope 170, the camera 170, the camera mount system 100, and/or another device. Multiple viewers can then watch the display. In addition, the camera 160, the spotting scope 170, and/or the camera mount system 100 can provide wireless and/or wired communications to other devices with displays (e.g., smartphones, laptops, wearable displays, screens, computers, monitors, etc.) so that others may watch using their respective displays and/or communication devices.

In an example scenario, the camera 160 is integrated in the camera mount system 100 as an integrated sensor within the same housing. By adjusting the mounting of the mount 100 to the scope 170, the camera 160 or camera sensors can record the crosshairs along with the full magnification of the scope 170. In some embodiments, the full magnification and/or crosshairs can be incorporated into any high precision alignment process (e.g., the alignment process of one or more of the scope 170, the camera mount system 100, and the camera 160).

In some embodiments, the mirror 130A comprising a beam splitter may have transmissivity of between approximately 30% to approximately 70%. In some embodiments, the mirror 130A may have transmissivity smaller than approximately 30% and/or larger than approximately 70%. The transmissivity may be fixed or adjustable. In some embodiments, the transmissivity may be changed to adjust the amount of light going to the eye and/or camera depending on the light gathering capability of the optics and/or the ambient conditions. In some embodiments, the camera sensor size corresponds to the lens size and the size of the required space on the scope 170. In some embodiments, the angle of the incidence onto the mirror 130A or other optical elements is approximately 45°. In some embodiments, the angle of incidence onto the beam splitter and/or other optical elements is fixed or adjustable from approximately 45° or another angle to some other angle. For example, by customizing the beam splitter using compounding angles such as by changing the angle away from approximately 45°, a much thinner beam splitter may be employed and eye clearance distance may be gained. Further, the other optical elements (e.g., lenses, mirrors, etc.) of the scope 170 can be used to increase eye relief. In some embodiments, optical elements (e.g., lenses, mirrors, etc.) of the scope 170 and the camera sensor, for example, may be on an adjustable track for improved compatibility at short eye reliefs. This configuration enables the distance to be adjusted from the camera or camera sensors to the scope according to the eye relief of the scope.

In some embodiments, the first mirror 130A or another mirror may comprise a coating (e.g., an anti-reflective coating) that prevents or reduces extraneous light (e.g., ambient light entering the housing 110 via the eyepiece 120) from reaching the camera 160 and/or a camera sensor. The housing 110 may comprise a flat black color inside to further reduce extraneous light reflectivity.

In some embodiments, the housing 110 of the camera mount system 100 may be structured to hold the camera 160 and the scope 170. In some embodiments, one or both of the camera 160 and the scope 170 can be integrated into the camera mount system 100 into a single device. Referring to FIG. 1 a first end 123 of the housing 110 of the camera mount system 100 may receive the scope 170. One or more clamps may be used to tighten the housing 110 of the camera mount system 100 around the scope 170. A second end 133 of the housing 110 of the camera mount system 100 comprises the eyepiece 133. A distance between the first end 123 and second end 133 may be less than an inch to approximately 3 inches.

The first end 123 of the housing 110 may receive, hold, and/or mount the scope 170. Some mounting options include, for example, a strap, a Velcro strap, a hook-and-look fastener strap, a rubber adjustable strap, a clamp, a two piece clam style clamp, a connection, a quick detach cam connection, a collapsing collet system including multiple collet sizes and/or a pressure cap separate piece, a sleeve, a slip on sleeve with locking screws, different sized spacers to effectively change a scope diameter to fit the housing 110 of the camera mount system 100, two bolt clamps with spacers, and/or other mounting elements. Although shown as circular, the end 123 may take on different shapes and sizes according to some embodiments.

Figure 2:
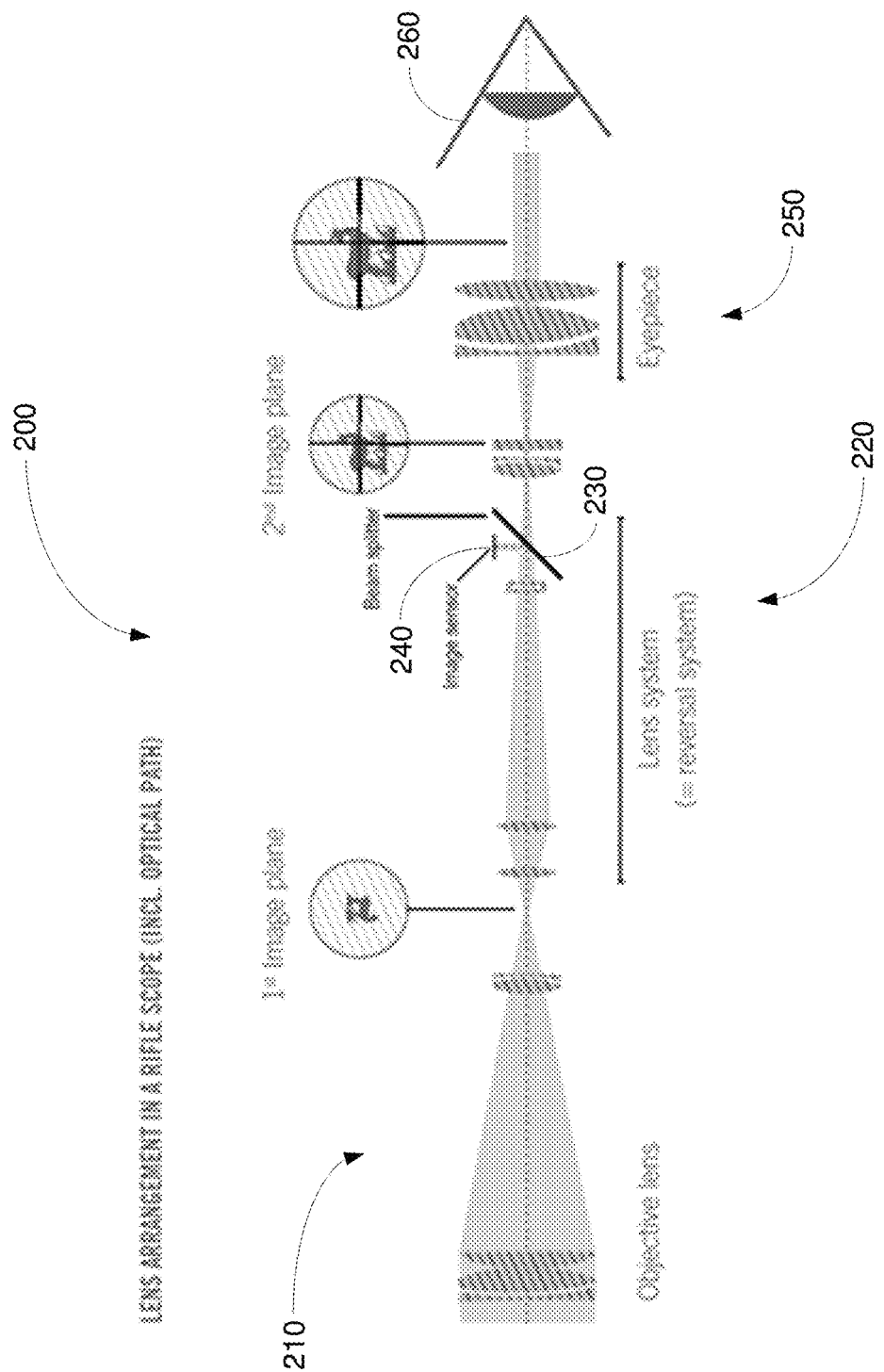
FIG. 2 shows an example scope according to an embodiment of the present disclosure.

FIG. 2 shows an example embodiment of a scope according to the present disclosure. Referring to FIG. 2, the scope 200 includes an objective lens system 210, a lens reversal system 220, a beam splitter 230, an image sensor 240 (e.g., one or more image sensors), and an eyepiece 250. Thus, the scope 200 and/or scope housing includes at least some of the features and/or elements of the camera 160 and/or the camera mount system 100. In some embodiments, the beam splitter 230 and the image sensor 240 can be positioned and/or re-positioned to different positions along the scope optical axis. In some embodiments, the beam splitter 230 and/or the image sensor 240 can be adjusted in position along the scope optical axis. In some embodiments, the beam splitter 230 and/or the image sensor 240 can be aligned with high precision as described herein.

In operation, light forming an image enters via the objective lens system 210 of the scope 200. As shown, the image is upside down after passing through the objective lens system 210. The image is turned right side up (or reversed) after passing through the lens reversal system 220. The lens reversal system 220 can also magnify the image. The image is then sent through the eyepiece 250 where the image is seen by the user's eye 260.

In the lens reversal system 220, the beam splitter 230 may be disposed in the light path of the image, thereby splitting the image in two by partially reflecting the image in a first direction and by partially transmitting the image in the second direction. The second direction is the path to the eyepiece 250. However, the first direction, which may or may not be substantially perpendicular to the second direction, is the path to the image sensor which is used to capture images (e.g., pictures, video, etc.).

Although illustrated as in the lens reversal system 220, some embodiments provide that the beam splitter 230 is disposed elsewhere along the optical path within the scope 200.

Figures 3A, 3B, 3C:
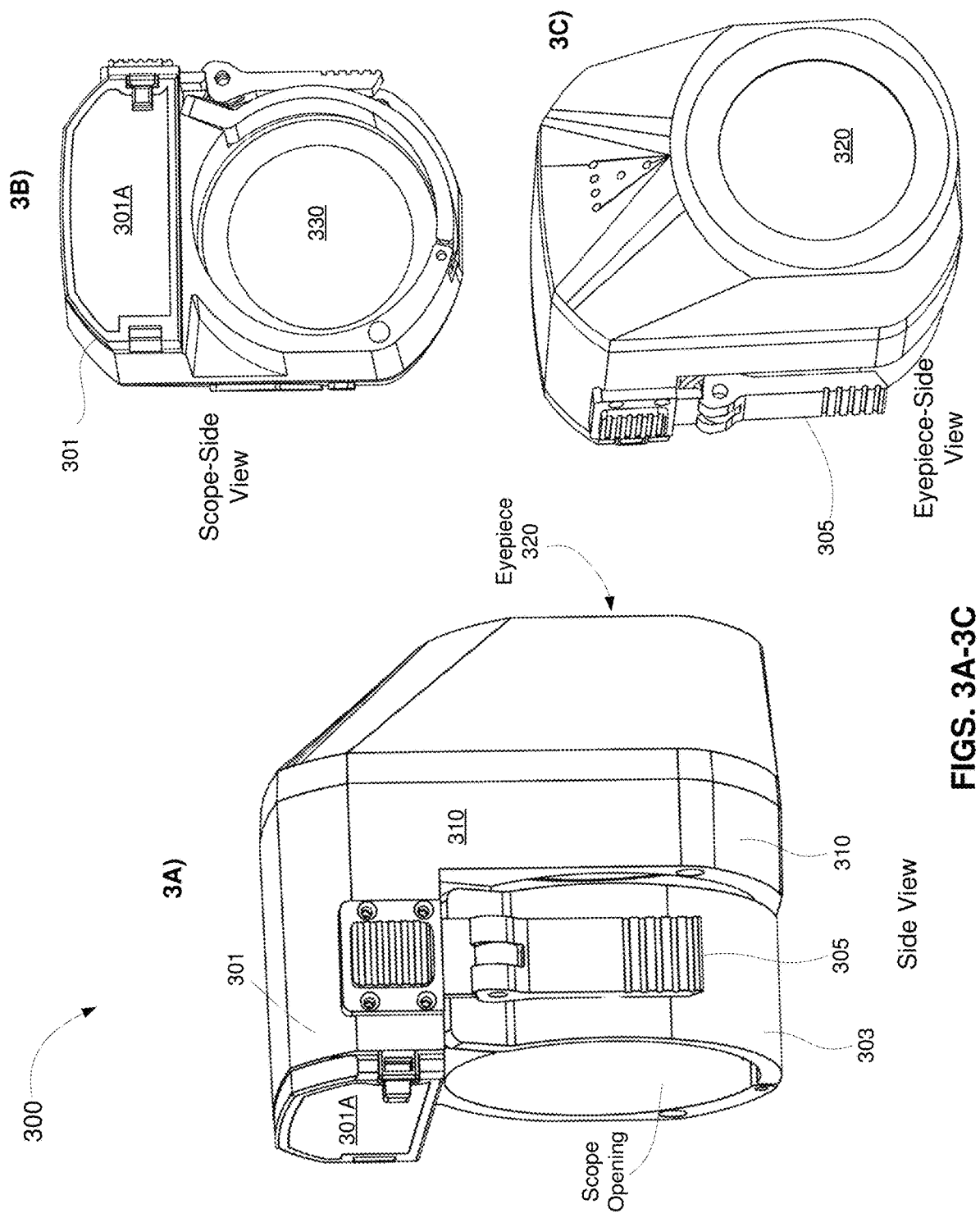
FIGS. 3A-3C show different views of an example embodiment of the camera mount system, in accordance with an example embodiment of the disclosure.

FIGS. 3A-3C show different views of an example embodiment of the camera mount system, in accordance with an example embodiment of the disclosure. Referring to FIGS. 3A-3C, there is shown camera mount 300 with a side view in FIG. 3A, a scope-side view in FIG. 3B, and an eyepiece-side view in FIG. 3C. The side view of FIG. 3A shows the scope opening where a collar 303 and clasp handle 305 may be operable to affix a scope to the mount 300. A different spacer may be placed within the collar 303 as needed to mate to different scope sizes. The housing 310 comprises the external structure of the mount 300 and provides structural support and optical isolation for internal optical components, and also comprises a battery compartment 301 with lid 301A.

In the scope-side view of FIG. 3B, the internal mirror/beam splitter 330 is visible, which may be operable to allow light into the mount 300 from a scope and pass a portion of the incoming light to the eyepiece 320, shown in the eyepiece-side view of FIG. 3C, while also reflecting a portion of the optical signal laterally to other optics in the mount 300, not visible in these views. The eyepiece-side view of FIG. 3C shows the eyepiece 320, which comprises a transparent optical element that may also comprise an anti-reflection coating to prevent glare. The eyepiece 320 also provides isolation from the elements for optical components within the mount 300.

In an example scenario, the scope to be attached to the mount 300 may be inserted into the collar 303 such that the scope is adjacent to the mirror/beam splitter 330 and the distance from an eyepiece of the scope to the eyepiece 320 may be less than two inches and preferably approximately 1 inch, meaning that eye relief to the scope is similar to the situation of not having the mount 300. This is in contrast to conventional camera mounts with cell phones or digital cameras, where a much larger reduction in eye relief occurs.

Figure 4:
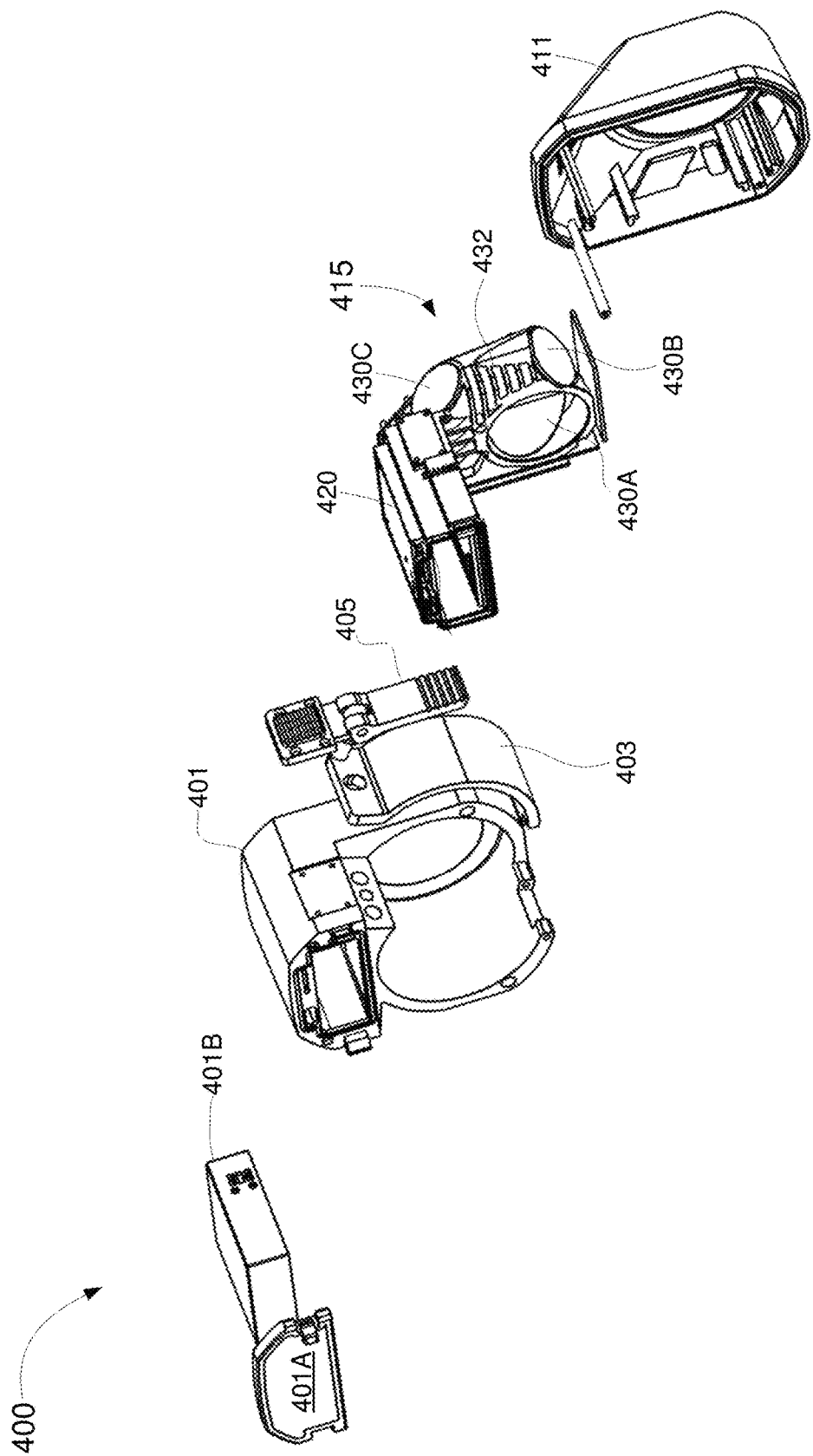
FIG. 4 illustrates an exploded view of the camera mount, in accordance with an example embodiment of the disclosure.

FIG. 4 illustrates an exploded view of the camera mount, in accordance with an example embodiment of the disclosure. Referring to FIG. 4, there is shown mount 400 with the components separated to show internal parts. FIG. 4 shows the battery housing 401, with battery 401B, and housing door 401A. In addition, collar 403 is shown with clasp handle 405 for affixing a scope to the mount 400. Internal optical components 415 are also shown, where the internal optical components 415 may comprises lenses, mirrors, and beam splitters, for example. In FIG. 4, the optical components 415 may comprise a beam splitter 430A, mirrors 430B and 430C, and lenses 432, similar to the optical elements described above with respect to FIG. 1. As in FIG. 1, the lenses 432 may be optional, depending on the focusing requirements of the sensor and the other optics of the system.

There is also shown electronics module 420, which may comprise a circuit board, for example, with circuitry for controlling the camera/sensor in the mount 400 (not visible in this view). The module 420 may therefore comprise a processor, memory, power management, communications circuitry, and sensor driver/readout circuitry, for example. The housing cap 411 may comprise a removable portion of the housing 310, which may provide environmental protection and optical isolation for the optical components 415.

Figure 5:
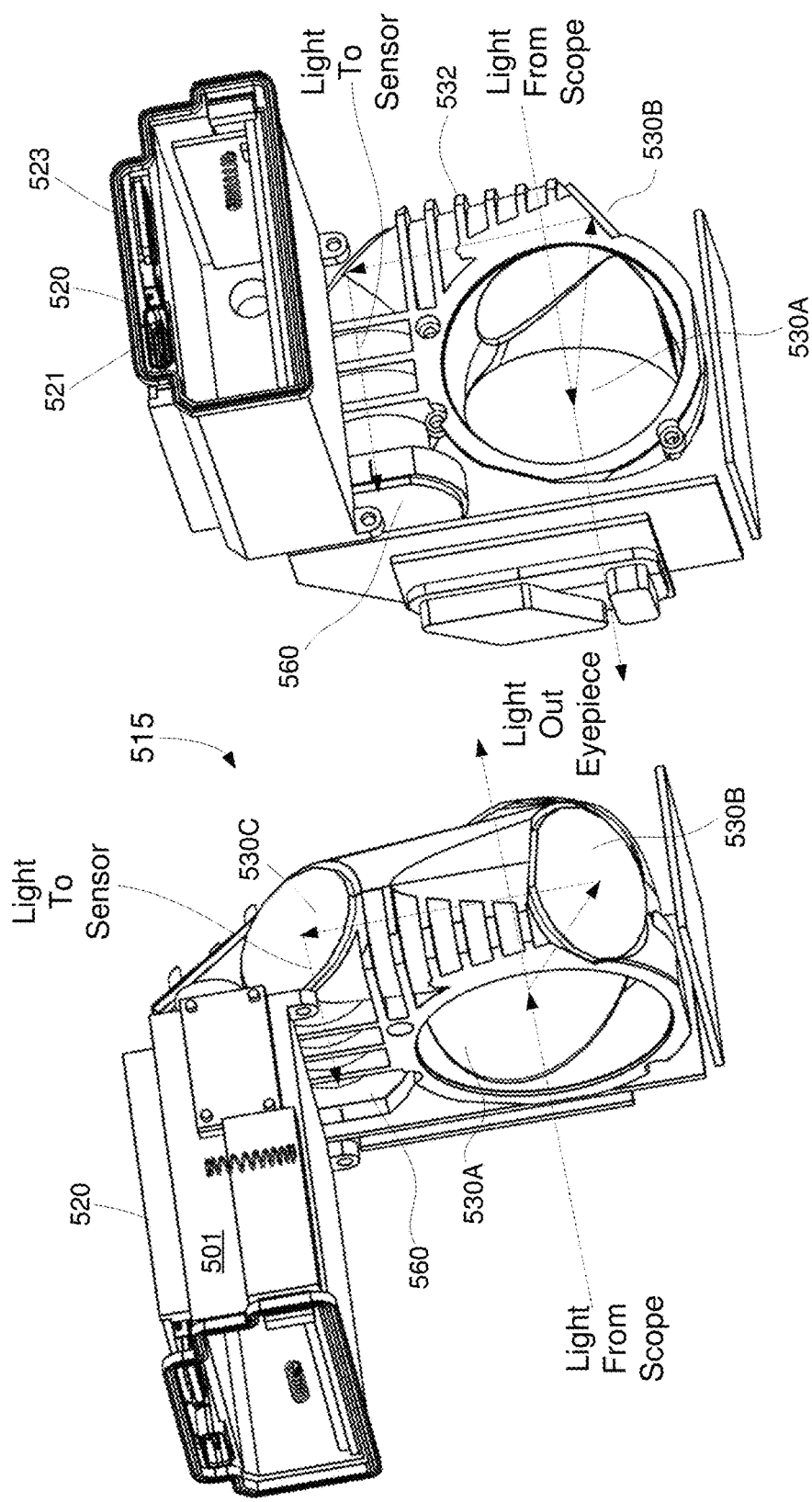
FIG. 5 shows two views of internal optical components in the camera mount, in accordance with an example embodiment of the disclosure.

FIG. 5 shows two views of internal optical components in the camera mount, in accordance with an example embodiment of the disclosure. Referring to FIG. 5, there is shown camera mount internal components 500 comprising internal optical components 515 and electronics module 520. The internal optical components comprise beam splitter 530A, mirrors 530B and 530C, and lenses 532. The lenses 532 may comprise one or more lenses and/or one or more spacers for communicating an optical signal between mirrors 530B and 530C. In addition, one or more lenses and/or spacers may be situated between the mirror 530C and the camera/sensor 560, where the lensing may enable the image focal plane to coincide with the plane of the camera/sensor 560. As described above, the lenses and spacers may be optional, depending on the focusing requirements of the sensor 560 and other optics of the system.

The optical paths are approximated by the dashed lines in FIG. 5, showing the source optical signal from a scope (not shown) split by the beam splitter 530A, with one portion passing through to the eyepiece and another portion reflected laterally to the mirror 530B. The signal reflected to the mirror 530B may then be reflected upwards through the lenses 532 where it may be reflected again by the mirror 530C to the camera/sensor 560. The optical path length in the optics 515 is configured to coincide with the focal length of an eyepiece of a scope coupled to the camera mount. In this manner, the image is focused on the sensor and on the user's eye.

The electronics module 520, as described previously, may comprise circuitry for controlling the camera/sensor 560 and any other circuitry in the camera mount, and therefore may comprise power circuitry, a controller, memory, communications circuitry, and sensor bias/readout circuitry, for example. In addition, one or more I/O ports may be coupled to the module 520 for communicating with external devices via a wired connection and also for charging of a battery in the camera mount.

There is also shown a USB-C port 521 and a SC card port 523 coupled to the electronics module 520, although other ports and storage media are possible. The port 521 enables the download of images and/or video captured by the sensor 560 and stored on an SC card in the port 523, for example.

Figure 6:
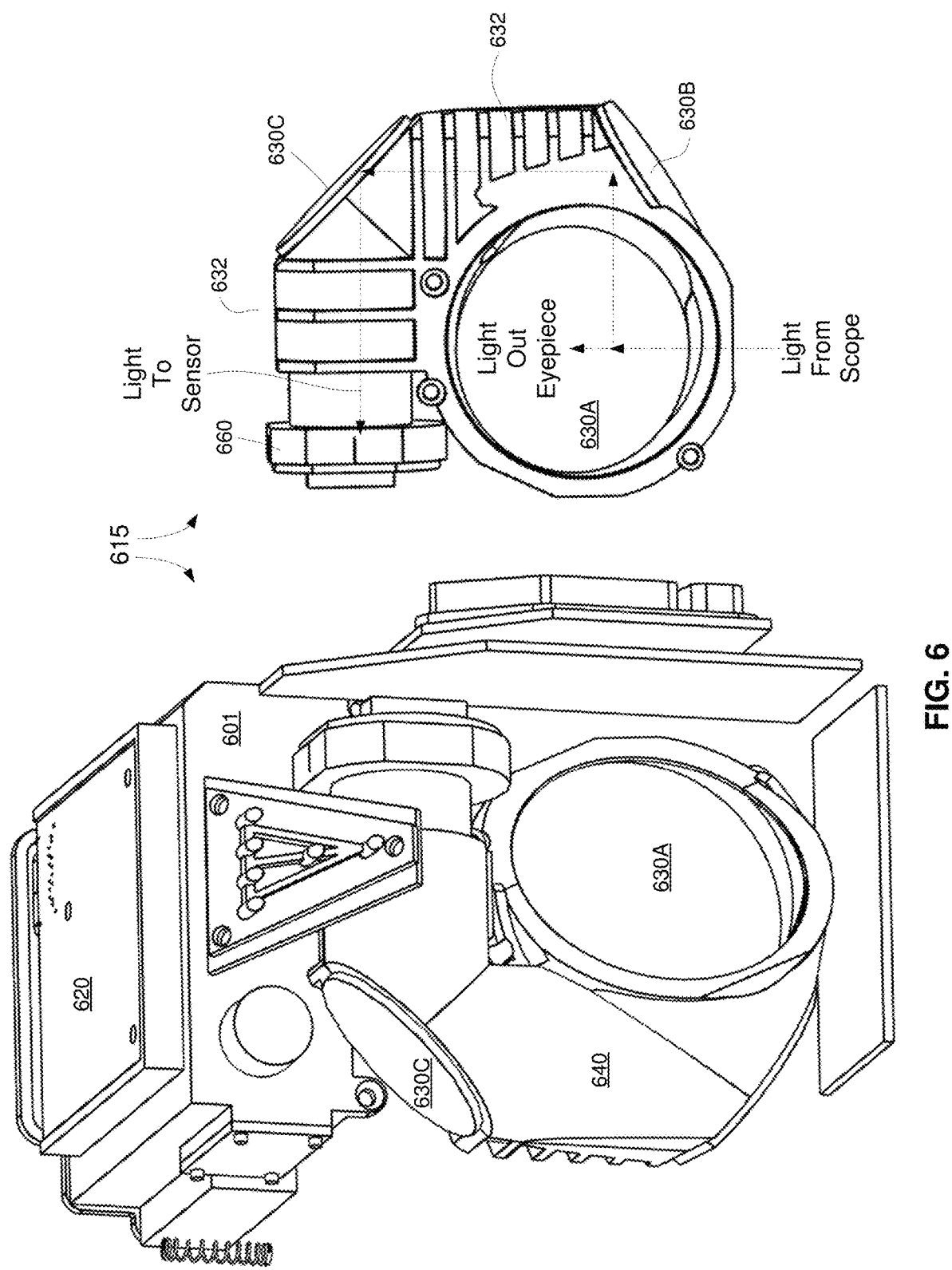
FIG. 6 shows further views of the internal optical components of a camera mount, in accordance with an example embodiment of the disclosure.

FIG. 6 shows further views of the internal optical components of a camera mount, in accordance with an example embodiment of the disclosure. Referring to FIG. 6, there is shown internal components of a camera mount comprising battery compartment 601, internal optical components 615, and electronics module 620. The battery compartment 601 and electronics module 620 may be similar to similar components described previously, and similarly the optical components 615 may comprise beam splitter 630A, mirrors 630B and 630C, lenses 632, and camera/sensor 660. The number of lenses 632 shown is merely an example, and any number of lenses, including zero, may be utilized depending on the focusing requirements of the sensor 660 and the other optics of the system.

There is also shown optical path housing 640, which comprises a housing for protecting the optical path from unwanted optical signals as wells as protecting the optical components, such as the beam splitter 630A, mirrors 630B and 630C, lenses 632, and camera/sensor 660, from the environment. The optical path housing 640 may comprise metal, plastic, or other suitable structural material.

As in previous figures, the dashed lines represent an approximated optical path, where the input optical signal from a scope (not shown) is split by the beam splitter 630A with a portion transmitting through the beam splitter 630A to the eyepiece and the remaining signal reflected to the mirror 630B. The signal is then reflected upward within the optical path housing 640 through the lenses 632 to mirror 630C, which reflects the signal through the remaining lenses 632 to the camera/sensor 660. This optical path length may correspond to the focal length of the scope such that the optical signal focal plane coincides with the camera/sensor 660. This optical path minimizes the loss of eye relief in a scope/rifle configuration.

Figure 7:
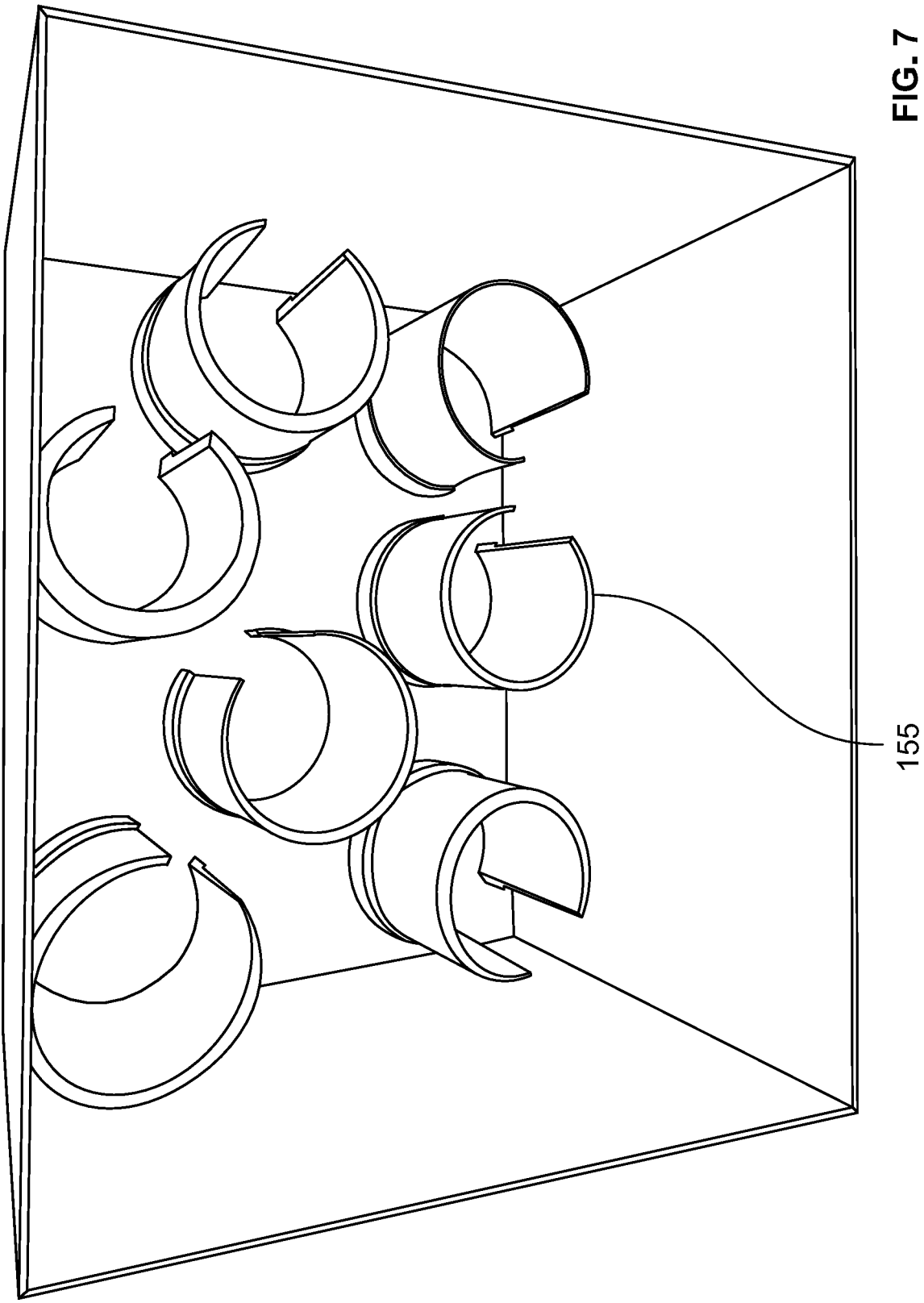
FIG. 7 shows embodiments of seven spacers for aligning a scope with the camera mount in accordance with an example embodiment of the disclosure.

FIG. 7 shows embodiments of seven spacers for aligning a scope with the camera mount in accordance with an example embodiment of the disclosure. The spacers 155 can have different thickness and different sized slots to accommodate different diameters of different scopes, for example. The slots provide flexibility and diameter tolerance, for example, when the spacers are secured by a clamp, for example, of the housing 110. Each spacer 155 is interchangeable and can be inserted into a mounting collar of the camera mount, such as collar 303 in FIG. 3. In some embodiments, adjustment for aligning the center of the scope optic with respect to the center of the camera view can be achieved by structuring the spacers as nonconcentric spacers 155. In some embodiments, the nonconcentric spacers 155 are made of nylon, but other materials may be used. The inside diameter of the nonconcentric spacer 155 that is inserted in the collar, for example, does not share a common center point with the outside diameter of the nonconcentric spacer 155. Thus, by generally rotating the spacer around the longitudinal axis of the collar, for example, the center of the scope optic can be adjusted with respect to the center of the camera view. In some embodiments, by generally rotating the spacer around the longitudinal axis of the collar, for example, the spacer 155 changes the true position of the camera mount system on the scope's objective, thereby enabling centering of the video, for example, being recorded. In some embodiments, the cross hairs of the scope can be moved to the center of the camera view (e.g., video view, etc.) by rotating a nonconcentric spacer 155.

Figure 8:
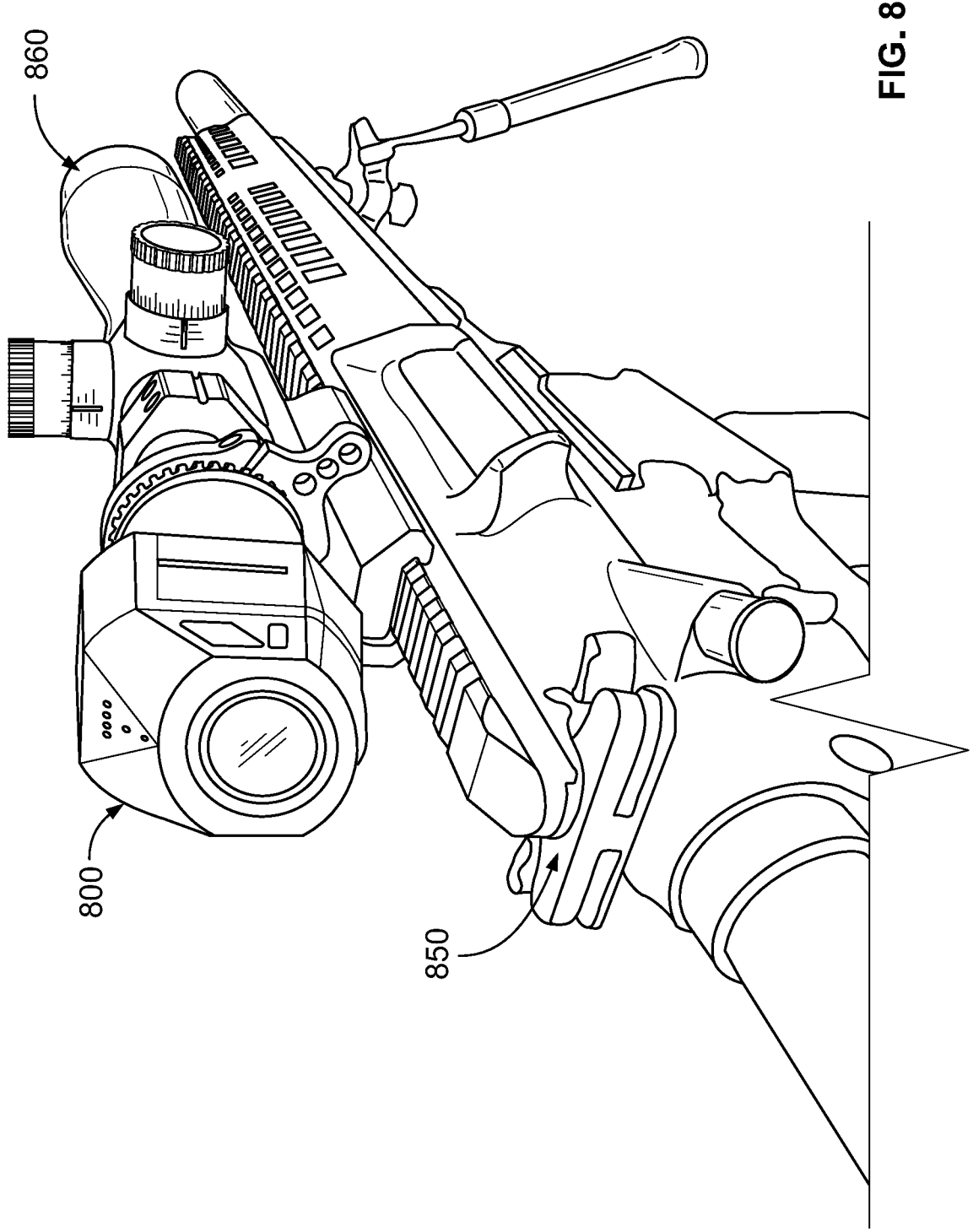
FIG. 8 shows an embodiment of the camera mount system according to the present disclosure.

FIG. 8 shows an embodiment of the camera mount system according to the present disclosure. Referring to FIG. 8, the camera mount system 800 is structured so that it does not flip out of the way. Instead, the entire camera mount system can be removed from or mounted on the scope 860 of the rifle 850, which can be a tool less operation (e.g., using a lever-style quick attached/detach mechanism). Some embodiments provide that the camera mount system has dimensions of approximately 3.1×2.3×2.75 inches and can have a weight of less than approximately 10 ounces. Further, the housing of the camera mount system 800 is waterproof. In some embodiments, the housing is made of aluminum.

The camera mount system 800 is removably attached to the scope 860 which, in turn, is attached to the weapon 850 (e.g., rifle). Although illustrated as being attached to rifle, the camera mount system 800 may be removably attached to any type of weapon, platform, tripod, bipod, etc. Further, the camera mount system 800 may be handheld and/or free standing.

Figure 9A:
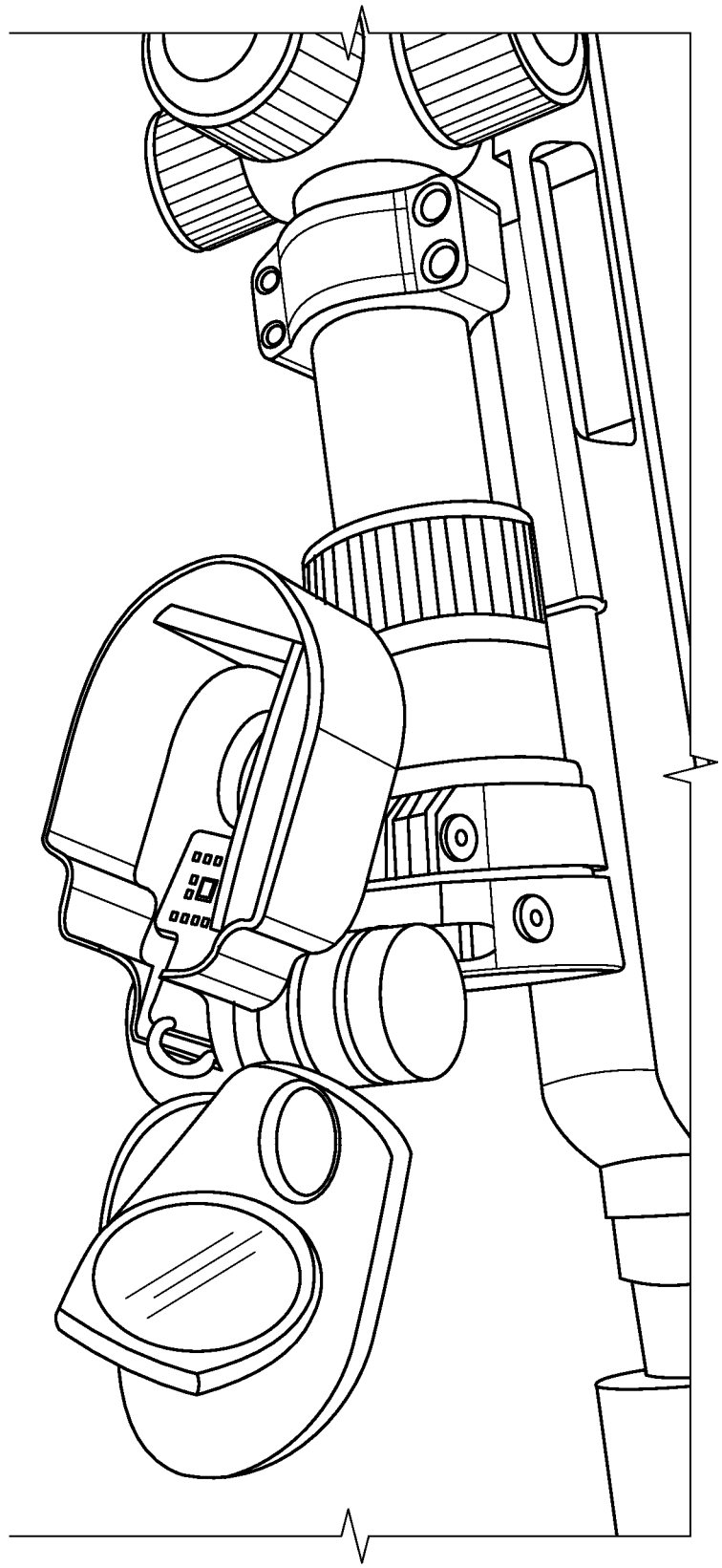
Figure 9B:
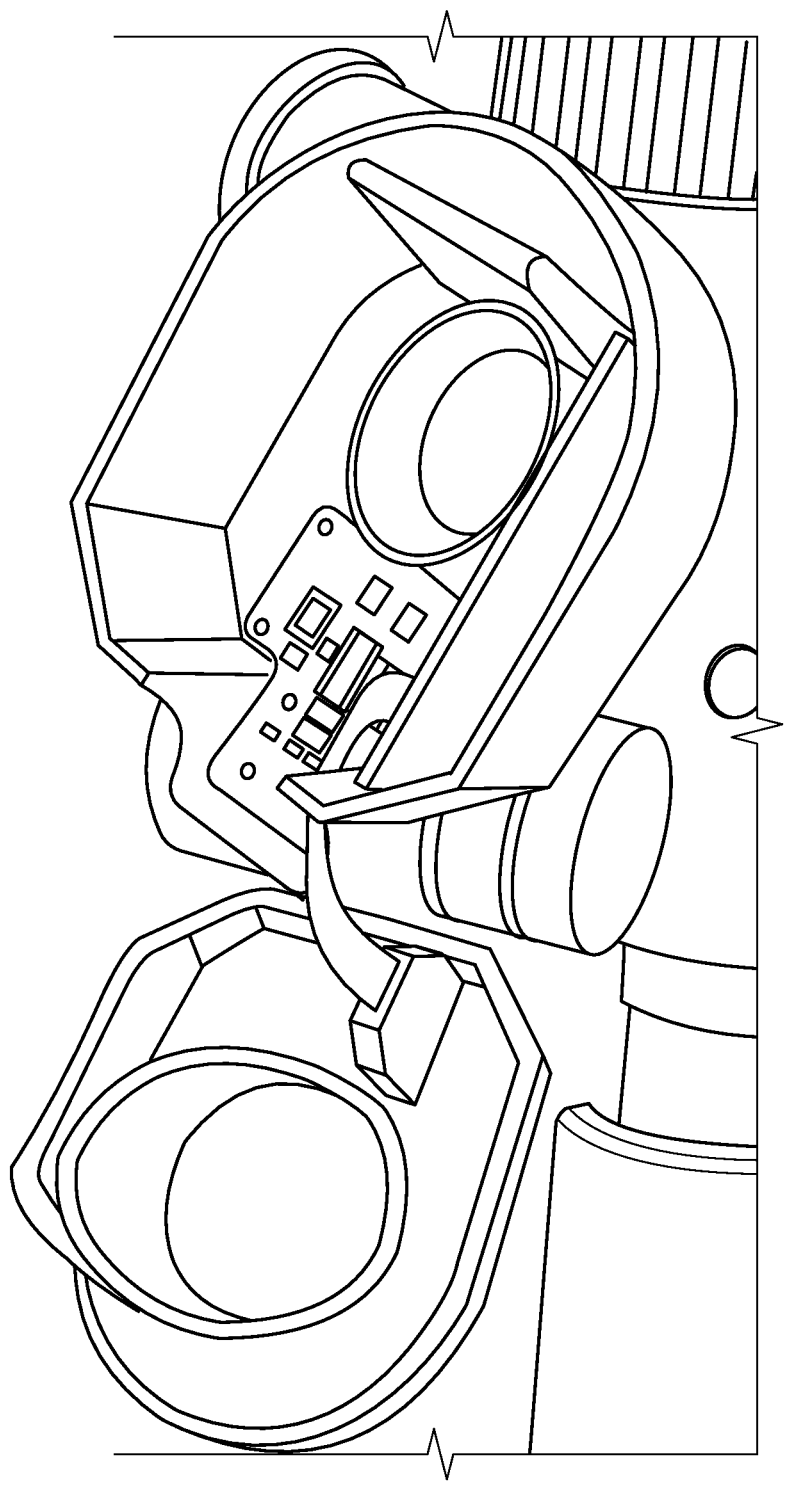
Figure 9C:
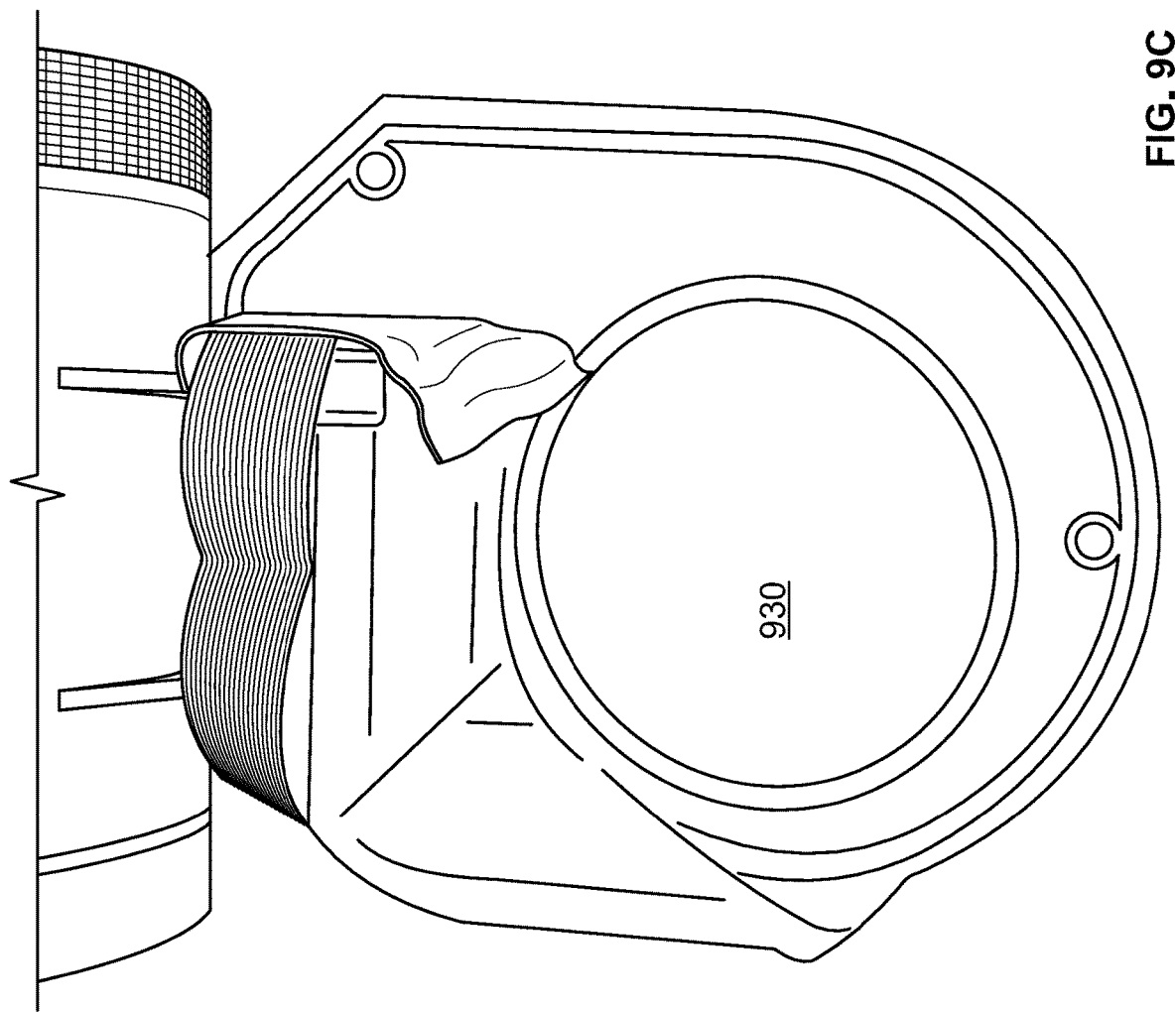
Figure 9D:
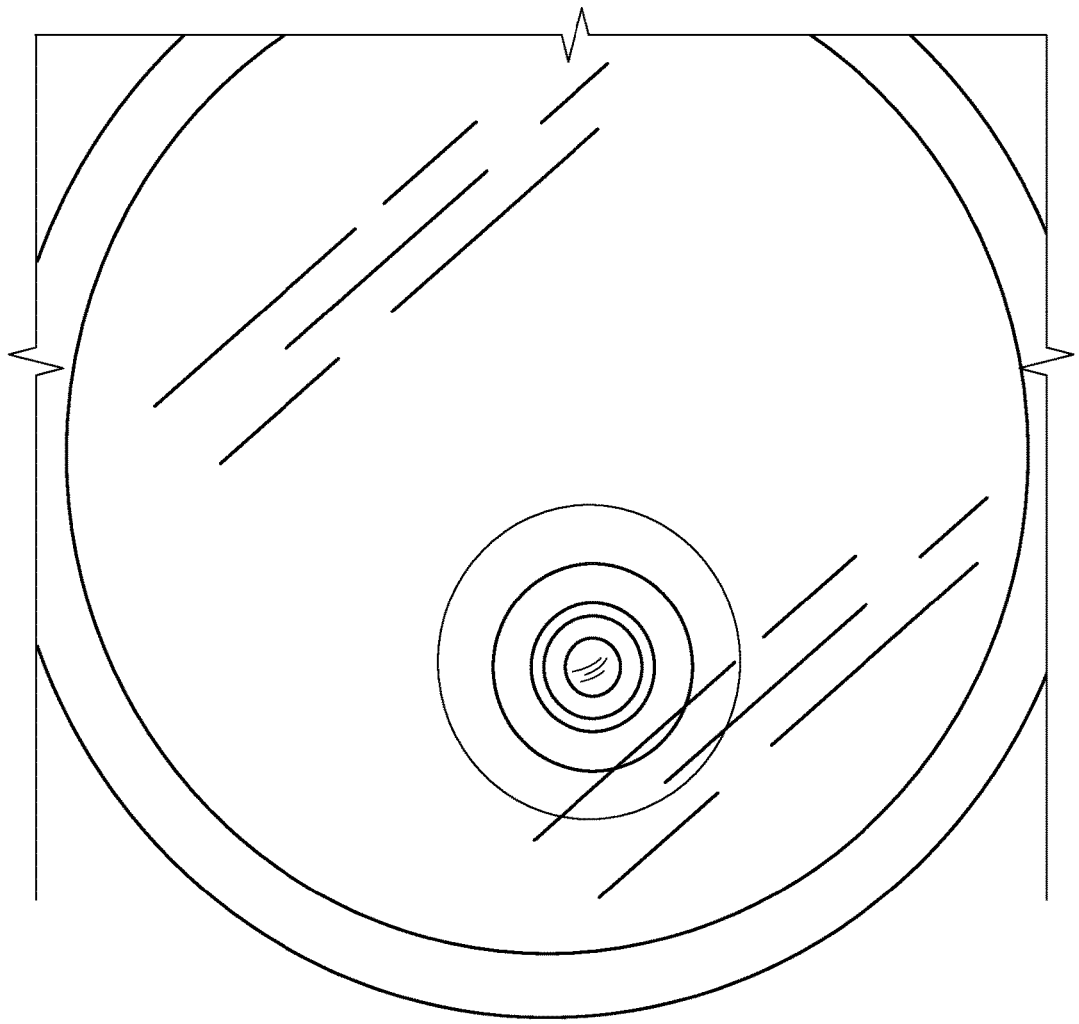
Figure 9F:
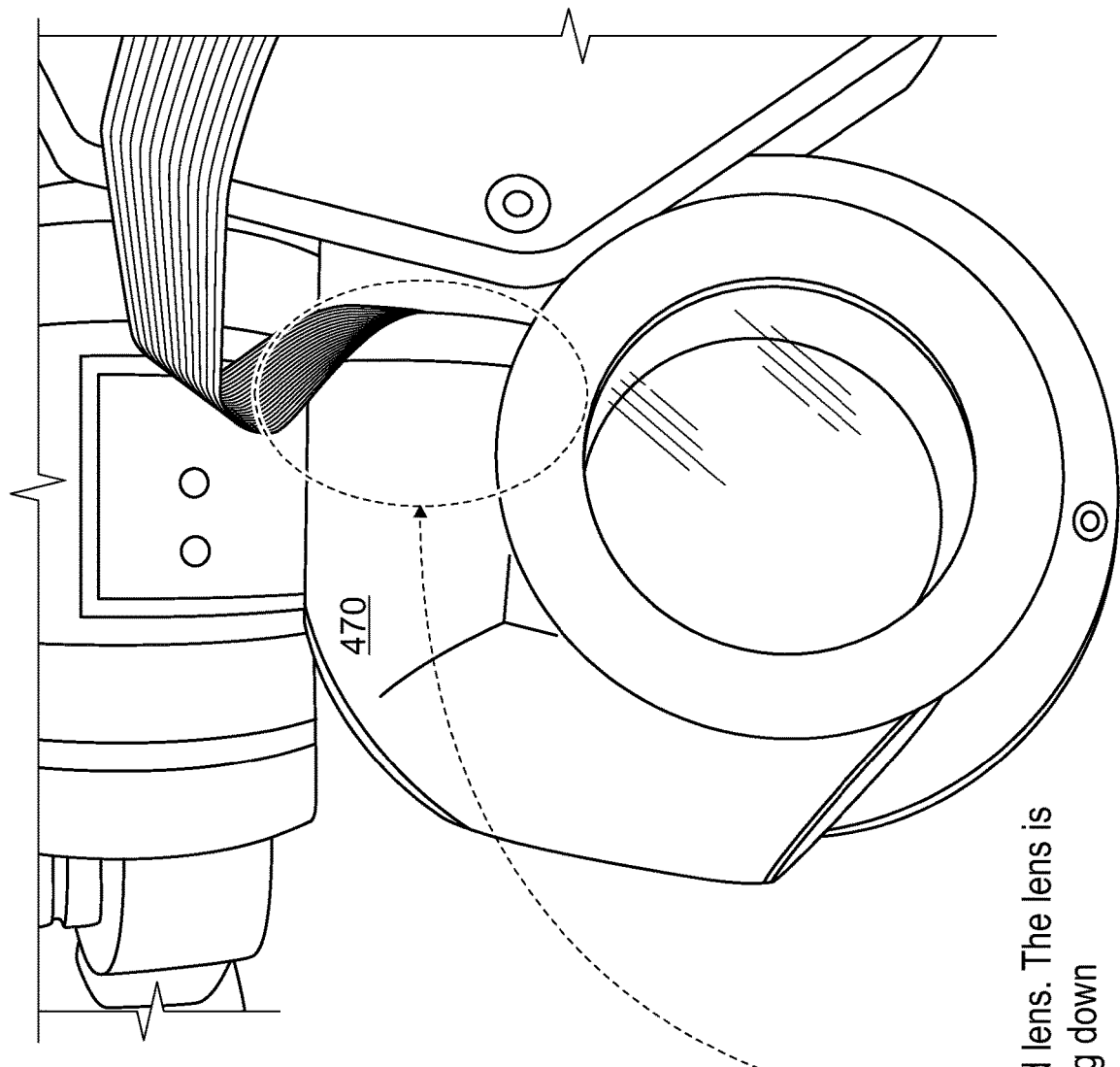

FIGS. 9A-G show an embodiment of a camera mount system in which the first housing is open. FIG. 9C shows a beam splitter 930 that is between the scope and the eye of the user. In some embodiments, the beam splitter redirects some of the incoming light (e.g., ½ stop of light) to the one or more camera lenses and the one or more sensors that are also within the mount. The compounding angle of the beam splitter from the objective is configured to allow the alignment of the light source with the first of the one or more mirrors (which can be inside a directing tube, for example). FIG. 9D shows light funneled into the directing tube from the beam splitter, where the camera lens is visible through the reflection in the deflecting mirror.

FIG. 9G shows an embodiment of a compounding angle for the beam splitter. In some embodiments, the beam splitter is not a flat mirror, but is egg shaped. Light may be funneled into a directing tube from the beam splitter. In some embodiments, the directing tube houses the one or more mirrors and lenses.

In FIG. 9E, mirrors may be located at each corner or change in direction of the directing tube 470 to direct the light to the one or more lenses and camera/sensor. In some embodiments, the length of the directing tube 470 can be changed to set the distance between the objective lens of the host optic (e.g., the scope) and the camera sensor. By reflecting the incoming light off of multiple mirrors, the camera eye relief can be extended while maintaining a small footprint or minimizing overall size. Depending on the application, a different number of mirrors and/or a different distance between the camera sensor and the objective lens of the scope can be configured without changing the footprint or overall size of the camera mount system. Different lengths of directing tube 470 can be used depending on the application. In some embodiments, the directing tube 470 is produced via 3-D printing. Different distances can also be made by adding or subtracting the number of mirrors, and/or adding or subtracting the number of twists and turns in the directing tube 470. In some embodiments, 4 mirrors were used, but the present disclosure contemplates using more or less than 4 mirrors. In some embodiments, the distance from the camera sensor to the objective of the scope along the light path should be the same as the distance between the eye of the user and the objective of the scope.

The camera mount may also comprise, for example, different types of input/output (I/O) ports, one or more processors, camera hardware, firmware, and/or software, power management hardware, firmware, and/or software, wireless and/or wired communications hardware and software, one or more displays, indicators (e.g., LED lights), I/O devices (e.g., buttons, displays, touch sensitive screens, graphical buttons, graphical elements, graphical user interfaces, etc.), a storage device, a memory, a memory card, one or more memory slots, etc. For example, indicator LEDs can provide information about battery charge, memory capacity, and/or mode (e.g., power mode, camera mode, communication mode, etc.). In some embodiments, the indicatory LEDs are visible from a preferred direction so as to avoid off-axis detection. Buttons such as a mode button, for example, can be provided camera mount housing that changes the mode of the camera (e.g., standard video mode, high resolution video mode, picture mode, low light mode, slow motion mode, etc.). Other buttons or switches may be provided for record on/off and/or power on/off, for example. In some embodiments, simple controls are provided with easily distinguishable button features (e.g., a large M button for changing modes). The housing may provide types of ports such as USB-type ports, HDMI ports, and power ports. Power ports can be used to recharge batteries 401B in the battery housing 301/401 by plugging the camera mount system 300/400 to a power source such as, for example, an AC power supply (e.g., a wall outlet) or a DC power supply. In some embodiments, an external battery pack or other power supply is provided, via a power port, for example, so that the batteries in the camera mount system 300/400 may be changed without powering off the camera, for example.

Thus, if an external battery pack is connected, then the batteries may be changed even without any break in recording by the camera. The external power supply can also be used to power the camera even if the batteries are completely drained, or to recharge batteries of the camera mount system 300/400.

The film through scope camera mount systems disclosed herein may be in communications (e.g., wireless and/or wired communications) with a wireless communication device (e.g., a remote control/monitor, a smart phone, a computing tablet, a laptop, a computer, etc.). The video and/or images received by the camera can be transmitted to a device for display. In some embodiments, multiple camera mount systems can send video and/or images to a device that can concurrently display all or some of the videos from the multiple camera mount systems.

In some embodiments, a mobile app or similar software or firmware on a mobile device (e.g., smart phone, etc.) or the camera mount system can work with or be integrated with an Android Team Awareness Kit or Android Tactical Assault Kit (ATAK) situational awareness platform. Through such a mobile app or similar software, cameras from multiple camera mount systems can be viewed simultaneously on a device using a split screen. Different views can be individually be selected and enlarged from the split screen. This can be useful streamed, real time video information to coordinate military and/or enforcement operations.

In some embodiments, such sharing of video can be quite useful for marksmanship training because an instructor can see through all the rifle optics of all the camera mount systems on one device when the students are holding for windage and elevation.

Systems, apparatuses, and methods are described which provide a film through scope camera mount comprising a housing that comprises a beam splitter, first and second mirrors, and a sensor. The camera mount system may receive an input optical signal from a first direction; split the input optical signal using the beam splitter such that a first portion of the input optical signal is communicated out of the camera mount system in a second direction and a second portion of the input optical signal is reflected lateral to the first direction; reflect the reflected signal vertically using the first mirror; reflect the vertically reflected signal in a second lateral direction using the second mirror; and receive the signal reflected by the second mirror in the sensor.

The sensor may comprise a visible light sensor and/or an infrared sensor. The housing may comprise an eyepiece through which the first portion of the optical signal is transmitted. The input optical signal may be received from a host optical device coupled to the housing. A distance from the eyepiece of the housing and an eyepiece of the host optical device may be less than 2 inches. A distance along an optical path from an eye of a user to the eyepiece of the host optical device may be the same as a distance along an optical path from the eyepiece of the host optical device to the sensor. The distance along the optical path from the eyepiece of the host optical device to the sensor may correspond to a focal length of the eyepiece of the host optical device. The host optical device may comprise a scope mounted on a weapon. One or more lenses is between the first and second mirrors and/or one or more lenses may be between the second mirror and the sensor.

Systems, apparatuses, and methods are described which provide a film through scope camera mount system. The camera mount system may include, for example, a first optical element and a second optical element. Incoming light from a scope on a weapon, for example, may be partially transmitted and partially reflected by the first optical element. The partially transmitted light passes through an eyepiece to a viewer (e.g., a shooter). The partially reflected light may be reflected by the second optical element and recorded by a recording device (e.g., a camera, a video recorder, sensors, etc.). The viewer has direct access to the scope optics, and the recording device and the viewer have access to the same view through the scope optics.

Some embodiments of the camera mount system according to the present disclosure provide that the camera mount system is compatible with any scope and can be mounted, via a film-through-scope mount and/or a flip-to-side mount, for example, on any weapon or other type of platform.

Some embodiments according to the present disclosure provide that the scope provides the focusing, magnifying, and/or field-of-view adjustments, thereby allowing for a lightweight, compact design of the camera mount system and the camera.

Although some embodiments of the film through scope camera mount system are described in combination with a scope for use on a weapon, the present application is not so limited. For example, the camera mount system can be used with different optical systems and/or instruments. Some embodiments provide that the camera mount system is attached and/or integrated with a spotting scope, a telescope, binoculars, field glasses, etc. Some embodiments provide that the camera mount system is attached and/or integrated with an arrangement and/or system of lenses and/or mirrors in which the arrangement and/or system may or may not be portable or mobile.

Some embodiments of the film through scope camera mount system according to the present disclosure provide consistency whether the camera mount system is used or not. A shooter, for example, will look through the scope in the same way whether the camera mount system is present or not, or whether the camera mount system is in place or flipped to the side via a flip-to-side mount, for example. This results in the shooter being able to easily locate and track a moving target, for example. Further, there is no eye strain from the camera mount system unlike digital screens that prohibit the user from viewing through the optic of the scope. In addition, the camera mount system allows the user to record video or capture images from the same view as seen through the scope.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A camera mount system, comprising:
 a housing comprising a housing first side, a housing second side opposite the housing first side, and a scope opening in the housing first side;
 an eyepiece in the housing second side, wherein the eyepiece is aligned with the scope opening along a first straight path between the scope opening to the eyepiece;

a beam splitter positioned within the housing along the first straight path, wherein the beam splitter is configured to:
  split an input optical signal received along the first straight path from a scope coupled to the scope opening into an input signal first portion that continues along the first straight path to the eyepiece and an input signal second portion that is reflected along a second straight path lateral to the first straight path;
a first mirror positioned within the housing along the second straight path and configured to reflect the input signal second portion from the beam splitter to a third straight path that is vertical to the second straight path;
a second mirror positioned within the housing along the third straight path and configured to reflect the input signal second portion from the first mirror to a fourth straight path that is lateral to the third straight path;
a sensor positioned within the housing along the fourth straight path and configured to sense the input signal second portion from the second mirror; and
one or more lenses in the housing, wherein the one or more lenses are positioned along the third straight path between the first mirror and the second mirror.

2. The camera mount system according to claim 1, wherein the sensor comprises a visible light sensor.

3. The camera mount system according to claim 1, wherein the sensor comprises an infrared sensor.

4. The camera mount system according to claim 1, wherein a distance from the eyepiece of the second housing side and an eyepiece of the scope coupled to the scope opening is less than 2 inches.

5. The camera mount system according to claim 1, wherein a distance along an optical path from an eye of a user to an eyepiece of the scope coupled to scope opening is the same as a distance along an optical path from the eyepiece of the scope to the sensor.

6. The camera mount system according to claim 5, wherein the distance along the optical path from the eyepiece of the scope to the sensor corresponds to a focal length of the eyepiece of the scope.

7. The camera mount system according to claim 1, comprising:
one or more additional lenses in the housing; and
wherein the one or more additional lenses are positioned along the fourth straight path between the second mirror and the sensor.

8. A method comprising:
receiving an input optical signal from an eyepiece of a scope via a scope opening in a first side of a camera mount housing;
splitting the input optical signal using a beam splitter positioned within the camera mount housing along a first straight path between the scope opening and an eyepiece in a second side of the camera mount housing such that an input signal first portion continues along the first straight path to the eyepiece in the second side of the camera mount housing and an input signal second portion is reflected along a second straight path lateral to the first straight path;
reflecting the input signal second portion from the beam splitter to a third straight path that is vertical to the second straight path using a first mirror positioned within the camera mount housing along the second straight path;
passing the input signal second portion through one or more lenses positioned along the third straight path between the first mirror and a second mirror;
reflecting the input signal second portion from the first mirror to a fourth straight path that is lateral to the third straight path using the second mirror positioned within the camera mount housing along the third straight path; and
sensing the input signal second portion from the second mirror with a sensor positioned within the camera mount housing long the fourth straight path.

9. The method according to claim 8, wherein the sensor comprises a visible light sensor.

10. The method according to claim 8, wherein the sensor comprises an infrared sensor.

11. The method according to claim 8, wherein a distance from the eyepiece in the second side of the camera mount housing and the eyepiece of the scope is less than 2 inches.

12. The method according to claim 8, wherein a distance along an optical path from an eye of a user to the eyepiece of the scope is the same as a distance along an optical path from the eyepiece of the scope to the sensor.

13. The method according to claim 12, wherein the distance along the optical path from the eyepiece of the scope to the sensor corresponds to a focal length of the eyepiece of the scope.

14. The method according to claim 8, comprising passing the input signal second portion through one or more additional lenses positioned along the fourth straight path between the second mirror and the sensor.

15. A weapon system, comprising:
a weapon;
a scope mounted to the weapon;
a camera mount system comprising a housing, a beam splitter, a first mirror, a second mirror, a sensor, and an eyepiece; and
one or more lenses in the housing;
wherein the housing comprises a housing first side having a scope opening coupled to an eyepiece of the scope and a housing second side opposite the housing first side;
wherein the eyepiece of the camera mount system is positioned along the housing second side such that the eyepiece of the camera mount system is aligned with the eyepiece of the scope along a first straight path;
wherein the beam splitter is positioned within the housing along the first straight path and is configured to split an input optical signal from the eyepiece of the scope into an input signal first portion that continues along the first straight path to the eyepiece the camera mount system and an input signal second portion that is reflected along a second straight path lateral to the first straight path;
wherein the first mirror is positioned within the housing along the second straight path and configured to reflect the input signal second portion from the beam splitter to a third straight path that is vertical to the second straight path;
wherein the second mirror is positioned within the housing along the third straight path and is configure to reflect the input signal second portion from the first mirror to a fourth straight path that is lateral to the third straight path;
wherein the sensor is positioned within the housing along the fourth straight path and configured to sense the input signal second portion from the second mirror; and
wherein the one or more lenses are positioned along the third straight path between the first mirror and the second mirror.

16. The weapon system according to claim 15, wherein the sensor comprises a visible light sensor.

17. The weapon system according to claim 15, wherein the sensor comprises an infrared sensor.

18. The weapon system according to claim 15, wherein a distance from the eyepiece of the second housing side and an eyepiece of the scope is less than 2 inches.

19. The weapon system according to claim 15, wherein a distance along an optical path from an eye of a user to the eyepiece of the scope is the same as a distance along an optical path from the eyepiece of the scope to the sensor.

20. The weapon system according to claim 15, comprising:
- one or more additional lenses in the housing; and
- wherein the one or more additional lenses are positioned along the fourth straight path between the second mirror and the sensor.

* * * * *